(12) United States Patent
Umansky et al.

(10) Patent No.: US 8,264,952 B2
(45) Date of Patent: Sep. 11, 2012

(54) METHOD AND APPARATUS FOR PROVIDING PACKET RING PROTECTION

(75) Inventors: Igor Umansky, Petach Tikva (IL); Alon Shavit, Qadima (IL)

(73) Assignee: Alcatel Lucent, Paris (FR)

( * ) Notice: Subject to any disclaimer, the term of this patent is extended or adjusted under 35 U.S.C. 154(b) by 115 days.

(21) Appl. No.: 12/042,053

(22) Filed: Mar. 4, 2008

(65) Prior Publication Data

US 2008/0219152 A1    Sep. 11, 2008

(30) Foreign Application Priority Data

Mar. 5, 2007  (EP) .................... 07300845

(51) Int. Cl.
*G01R 31/08* (2006.01)
*H04L 12/28* (2006.01)

(52) U.S. Cl. ........ 370/223; 370/222; 370/227; 370/228; 370/258

(58) Field of Classification Search .......... 370/222, 370/351, 223, 224, 353, 403, 404, 352, 216, 370/245

See application file for complete search history.

(56) References Cited

U.S. PATENT DOCUMENTS

| | | | | |
|---|---|---|---|---|
| 6,992,975 | B1 * | 1/2006 | Daniel et al. | 370/222 |
| 7,269,129 | B2 * | 9/2007 | Yasuo et al. | 370/217 |
| 2005/0094554 | A1 * | 5/2005 | Nakash | 370/222 |
| 2007/0172238 | A1 * | 7/2007 | Harada et al. | 398/59 |

FOREIGN PATENT DOCUMENTS

| | | |
|---|---|---|
| EP | 1 322 056 A1 | 6/2003 |
| WO | WO 2006/038248 A1 | 4/2006 |

* cited by examiner

*Primary Examiner* — Yemane Mesfin
*Assistant Examiner* — Samina Choudhry
(74) *Attorney, Agent, or Firm* — Carmen Patti Law Group, LLC

(57) ABSTRACT

For a ring protection method in a packet transport network a failure is detected at a first network node (N4) in the ring (1, 2). The failure is communicated along the ring (1, 2) using an automatic protection switching protocol. At the first node (N4) or at a second node (N1) adjacent to the failure, a protection switch-over for at least one protected traffic stream (4) is activated by redirecting the traffic stream (4) into the reverse direction of the ring (1, 2). Selected network nodes (N2, N5) along the ring squelch the traffic stream (4) in accordance with pre-configured squelching tables. Squelching is performed only by networks nodes along the ring which perform either an add function or a drop & continue function for the traffic stream (4) to be squelched.

9 Claims, 3 Drawing Sheets

METHOD AND APPARATUS FOR PROVIDING PACKET RING PROTECTION

The invention is based on a priority application EP 07 300 845.0 which is hereby incorporated by reference.

TECHNICAL FIELD

The present invention relates to the field of telecommunications and more particularly to a method and apparatus for providing ring protection in a packet transport network.

BACKGROUND OF THE INVENTION

In telecommunication networks, protection refers to the ability to recover protected traffic in the case of a failure by switching over automatically to a redundant resource. For TDM-based transport networks, sophisticated protection mechanisms have been described and defined. The basic standard in SDH (Synchronous Digital Hierarchy) that describes types and characteristics of protection architectures is ITU-T G.841 (October 1998), which is incorporated by reference herein.

A basic topology in protected networks is a ring network. In order to avoid misconnections in a ring protection scheme in the case of a double failure, a mechanism known as "squelching" has been developed for SDH rings. Squelching implies that the traffic addressed to nodes that are isolated due to a double failure occurring in the ring is 'squelched' at switching nodes, i.e. replaced or overwritten with AIS (Alarm Indication Signal). A switching node is any node that performs a bridge or switch function for a protection event. The generalized squelching logic is defined in G.841 Appendix II.

In order to make squelching work properly in a TDM ring it is required to configure each node in the ring with a ring map. Each of the ring maps must contain information regarding the order in which the nodes appear on the ring. In addition each node requires a connection map that contains the AU-4 time-slot assignments for traffic that is both terminated at that node and passed-through that node and a squelch table that identifies for each of these AU-4 time slots the node addresses at which the traffic enters and exits the ring.

Today, packet transport networks as opposed to classical TDM networks are emerging. Protocols for packet transport are currently under development, one of which is referred to as T-MPLS (Transport MultiProtocol Label Switching). Transport MPLS is a purely connection-oriented packet transport network based on MPLS that provides managed connections to different packet client layer networks.

Hence, protection mechanism and strategies for packet transport networks need to be defined. Packet ring technologies could possibly reuse the above mentioned protection techniques known from TDM networks. However, a direct adoption of TDM methods to packet transport network would not provide efficient bandwidth usage.

In a TDM network, a connection (e.g. a VC-4 timeslot) actually determines the bandwidth this connection occupies, regardless of the amount of user traffic currently transmitted over this connection. This means that since a TDM connection needs to be pre-provisioned, its bandwidth cannot be effectively used by other connections.

Conversely, in packet technology, a connection (e.g. a T-MPLS label) specifies a route through the network but it does not determine the bandwidth which is actually occupied by user traffic transmitted on this connection. The total amount of bandwidth in a packet network can be effectively shared between different connections not only at the provisioning stage but also during network operation in both normal and protection situations.

Moreover, it is expected that in T-MPLS rings the number of connections could reach more that ten thousands. This would increase the complexity and require a long time for the configuration (e.g., via network management or local crafts personnel) of all nodes in the ring through which these connections are passing and may make the target protection time of 50 ms difficult to achieve.

The squelching mechanism in TDM developed for misconnection avoidance does not address the variable bandwidth nature of packet traffic and does not address the scalability problem, which arises due to the high number of connections in the packet ring. The inherent constrains of TDM technology when applied to packet rings would lead to inefficient bandwidth resource usage; configuration scalability issue; and increased protection switching time.

In view of the above discussed constraints, it is a problem of the present invention to provide a method and corresponding apparatus for providing packet ring protection.

SUMMARY OF THE INVENTION

These and other objects that appear below are achieved by a ring protection method in a packet transport network with the following steps:

A failure is detected at a first network node in the ring.

The failure is communicated along the ring using an automatic protection switching protocol.

At the first node or at a second node adjacent to the failure, a protection switch-over for at least one protected traffic stream is activated by redirecting the traffic stream into the reverse direction of the ring.

Only selected network nodes along the ring squelch the traffic stream according to pre-configured squelching tables.

According to the invention, the step of squelching is performed only by networks nodes along the ring which perform either an add function or a drop&continue function for the traffic stream to be squelched.

This increases the efficiency of packet transmission compared to the SDH rings squelching mechanism since traffic streams that will be lately discarded anyway are replace at an early stage with an AIS signal that does not require much bandwidth.

According to a further aspect of the invention a network node for a packet ring network is provided which has first type interfaces for connection to the ring network, second type interfaces for adding or dropping traffic signals to or from the ring network, respectively, and a switch matrix arranged between said first type and second type interfaces. The switch matrix is controlled by a controller to redirect a protected traffic stream in the event of a failure. The controller is adapted to determine in accordance with a set of squelching rules and based on a pre-configured squelching table traffic streams to be squelched. In accordance with the invention, squelching table contains only traffic streams for which the network node performs either an add or a drop&continue function.

BRIEF DESCRIPTION OF THE DRAWINGS

Preferred embodiments of the present invention will now be described with reference to the accompanying drawings in which.

DETAILED DESCRIPTION OF PREFERRED EMBODIMENTS

Figure 1:
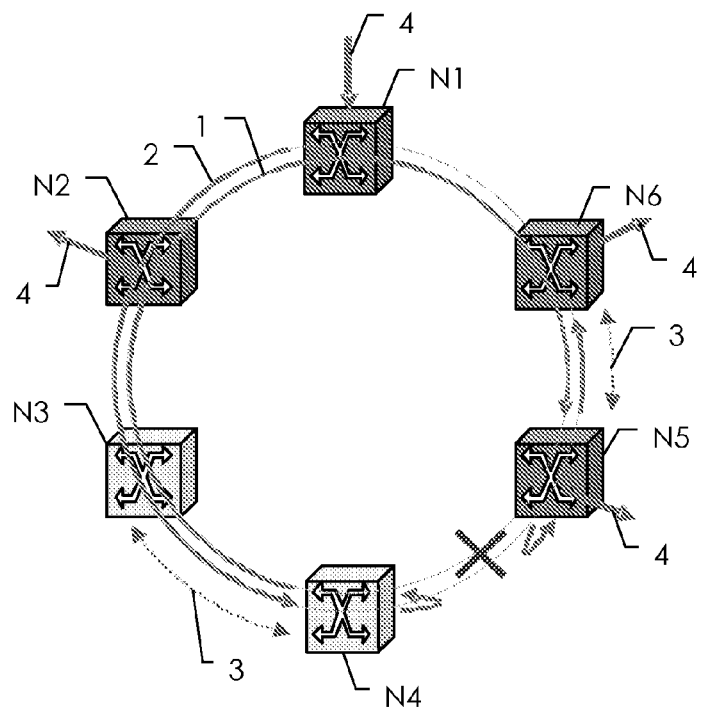
FIGS. 1 to 4 show a packet transport network with ring topology at different failure scenarios and FIG. 5 shows a block diagram of a network node for use in a packet transport network.

An ring network for packet transport is shown by way of example in FIG. 1. The example network contains six network nodes N1-N6 connected to form a two-fiber ring. Fiber 1 is operated in clockwise direction while fiber 2 is operated in counter-clockwise direction. Accordingly, signals on fiber are also designated as "eastbound" and signals on fiber 2 as "westbound".

Both fibers 1, 2 can carry traffic and offer additional protection resources. Each node can be reached over both fibers. Nodes N1, N2, N5, and N6 perform add or drop functions on the traffic in the ring. Nodes N3 and N4 only pass the ring traffic through. In particular, node N1 adds a traffic stream 4 to the ring. Node N2 performs a drop & continue function on the traffic stream 4. "Drop & Continue" function is a function that is implemented within a node wherein the traffic is dropped from the ring and, at the same time, continued over the ring. Similarly, node N5 performs a drop & continue function on the same traffic stream 4 and node N6 finally drops the traffic stream 4 from the ring. Hence a point-to-multipoint connection from node N1 to nodes N2, N5, and N6 exists.

When a failure occurs on the ring, such as shown between nodes N4 and N5 in FIG. 1, this failure is communicated using an APS protocol (APS: automatic protection switching) to signal a failure and initiate a switch-over of traffic in the reverse direction. A well known APS protocol is the K1/K2 protocol in SDH. Since in the present case, the ring is broken between nodes N4 and N5, both nodes detect a server signal failure (SSF) and communicate this failure over the remaining ring segment. As indicated by arrows 3, APS signaling hence occurs between nodes N4 and N5. Intermediate nodes N3, N2, N1, N6 will analyze the APS messages. Due to this, all nodes N1-N6 along the ring 1, 2 will know about the failure.

As a reaction to the failure, node 4 performs a loop-back of the protected traffic stream 4 destined for nodes 5 and 6 from fiber 2 to fiber 1. In the same way node 5 would loops back protected traffic designated for node 4 from fiber 1 to fiber 2.

In the undisturbed ring, traffic stream 4 would be routed over ring 2 along the path N1, N2 (drop&continue), N3, N4, N5 (drop&continue), and N6 (drop). After the ring failure between nodes N4 and N5, traffic stream 4 is re-routed along the path N1, N2 (drop&continue), N3 to N4 over ring 2 and back from N4 over ring 1 along the path N4, N3, N2, N1, N6 to N5 and back from N5 (drop&continue) to N6 (drop).

In this situation, no squelching is required, since no node is isolated through the failure. There is hence no substantial difference in the protection mechanism as compared to known TDM mechanisms.

Figure 2:
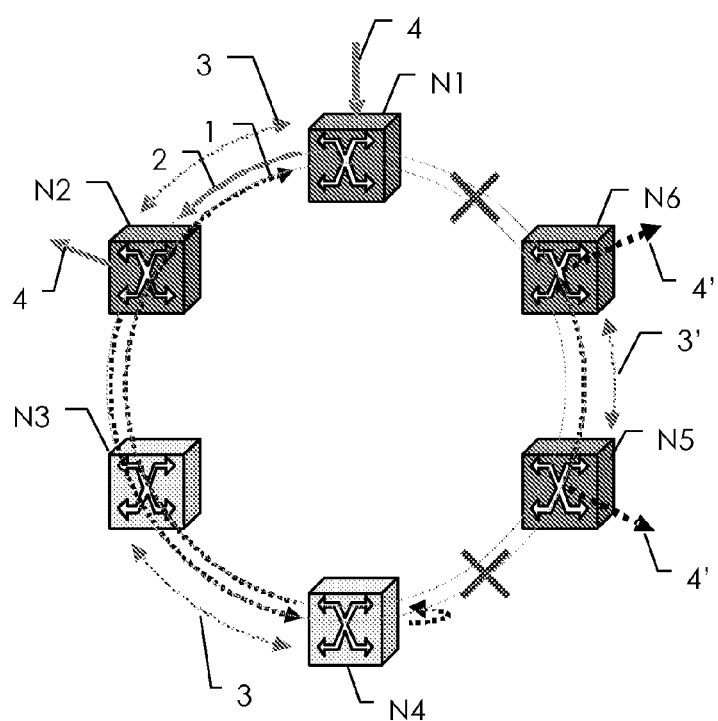

In FIG. 2, the same ring network is shown but with a dual ring failure disconnecting the ring between nodes N4 and N5 and between nodes N6 and N1. Now nodes N6 and N5 are isolated. In such situation APS signaling 3 will occur between nodes N4 and N1, so that the all nodes N1-N4 on the left ring segment are aware of the unavailability of nodes N5 and N6. In addition APS signaling 3' will occur between nodes N5 and N6.

In a traditional TDM protection scheme, Node N1 will continue sending user traffic 4, though it will be discarded at node N4, which means that part of the ring carries traffic that has no destination anymore.

In a traditional TDM ring protection scheme, node N4 would activate a protection switch from fiber 2 to fiber 1 but would squelch the traffic destined for nodes N5 and N6 in order to avoid misconnections. In the TDM protection scheme, each node which is not directly involved in connection add, drop, or drop&continue, i.e. nodes N3 and N4 must be aware of each passing connection to support squelching.

The number of connections passing through each node can be very high in a packet ring network. Moreover, configuring squelching table at every intermediate node for each connection addresses scalability issues.

According to a basic idea of the invention squelching tables are configured only for certain connection at nodes performing add, drop or drop&continue operations for this connection In addition, the standard TDM ring protection scheme specifies that squelching is performed by switching nodes (i.e. node N4 in FIG. 2). This means that traffic is transmitted from an ingress node at least up to the switching node. In a packet network transmission of traffic to a node where it will be lately discarded means inefficient usage of ring bandwidth along the connection. Therefore, another optimization provided by the invention is to squelch the traffic as soon as possible. For point-to-point connections this means to squelch the connection at the add node. For point-to-multipoint connections this means to squelch at the last drop&continue node that is not isolated by the ring failure from the entry node.

According to the invention, only an AIS message (AIS: Alarm Indication Signal) is sent, which does require much bandwidth. The ring bandwidth is not occupied with user traffic that later will be discarded anyway. As an alternative, the failed traffic stream could also simply be terminated. So, the term squelching in the context of the present invention should be understood to include AIS insertion as well as termination of the traffic stream.

In other words, the proposed solution modifies the set of squelching rules known in TDM, so that squelching is performed only by 'add' or 'drop&continue' (d&c) nodes instead of switching nodes (node N4 in FIG. 2). The connection map for protected connections in such case is provisioned only to add/drop/d&c nodes involved in the corresponding connection (nodes N1, N2, N5, N6 in FIG. 2), and not provisioned to all intermediate nodes along the connection path (nodes N3, N4 in FIG. 2).

A ring node map is, however, provisioned to all nodes in the ring as it is in the standard TDM scheme. Nodes will discover the ring failures either locally or remotely by an APS protocol supported through APS messages exchange among the ring nodes. So ring failure are detected in the same way as in the known TDM solution.

Below is a list of the modified squelching rules used in preferred embodiments.

a) for point-to-point connections:
  Exit node failure:
    Assumed, with respect to the add node, that the failure is in the direction of the unidirectional circuit. Squelch the circuit (replace the working signal with the AIS at add node in the downstream direction) if and only if the node failure scenario includes the exit node for the unidirectional circuit.

Entry node failure:
  Assumed, with respect to the drop node, that the failure is in the opposite direction from the direction of the unidirectional circuit. Squelch the circuit (replace the drop signal with the AIS at drop node) if and only if the node failure scenario includes the entry node for the unidirectional circuit.
Add and drop nodes (not switching nodes):
  Analyze APS information transmitted by switching nodes and perform squelching according to the rules above b) for p-t-mp connections:
Next and exit node failure
  Assumed, with respect to add or d&c node, that the failure is in the direction of the multiple dropped unidirectional circuit. Squelch the circuit (replace the working signal with the AIS at add or d&c node in downstream direction) if and only if the node failure scenario includes both the next d&c node and the exit node for the multiple dropped unidirectional circuit.
Entry node failure
  Assumed, with respect to the d&c or drop node, that the failure is in the opposite direction from the direction from the repeatedly dropped unidirectional circuit. Squelch the circuit (replace the working signal with the AIS at d&c or drop node) if and only if the node failure scenario includes the entry node for the multiple dropped unidirectional circuit.
Add, drop and d&c nodes (not switching nodes)
  Analyze APS information transmitted by switching nodes and perform squelching according to the rules above As a consequence of the dual ring failure in FIG. 2, node N2 performs squelching of the 'continue' traffic forwarded on the ring since both the next node N5 and the exit node N6 are isolated. Node N5 performs squelching because entry node N1 is isolated. The arrows indicating the path of traffic stream 4 on rings 1 and 2 are shown with broken lines for squelched connections in FIG. 2. While node N2 squelches only the 'continue' traffic on the ring, node N5 squelches both the 'drop' traffic exiting the ring and the 'continue' traffic looped back onto ring 1 towards node N6.

Figure 3:
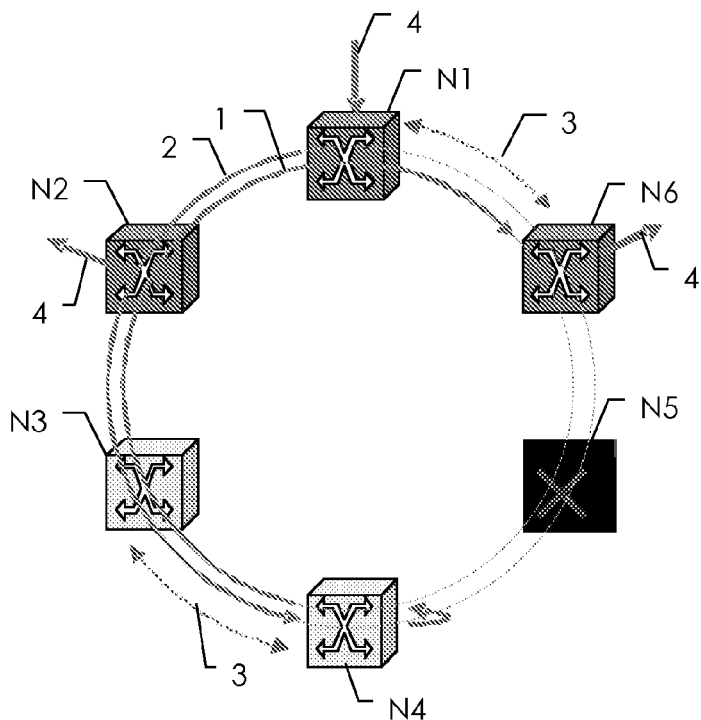

FIG. 3 shows the same ring network but with a node failure of node N5. Due to this failure, the connection between nodes N4 and N6 via node N5 is broken and node N4 and N6 hence detect an SSF event. APS signaling occurs between nodes N4 and N6. All intermediate nodes N1-N3 analyze the APS messages and hence know about the failure. Node N4 performs a loop-back of traffic destined for node N6. Due to the activation of the protection switching in node N4, node N6 receives the traffic stream 4 from ring 1. Node N6 would also loop back traffic destined for node N4 if there was any.

According to the above rules, node N2 does not perform squelching since only node N5 is isolated but traffic stream 4 is still required for nodes N2 and N6.

Figure 4:
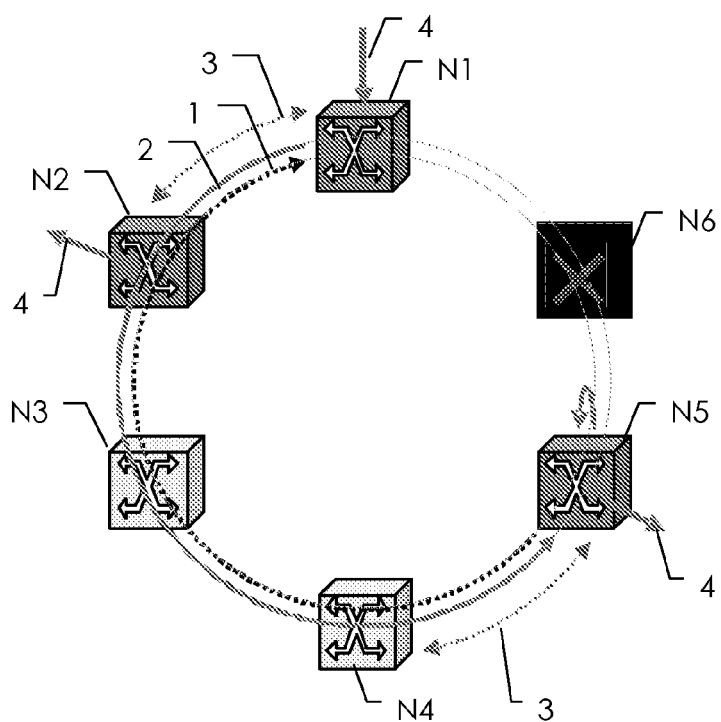

In FIG. 4, a node failure affects node N6 rather than node N5. APS signaling is now between nodes N1 and N5. All nodes analyze the APS messages and hence know about the failure. Node N2 does not perform squelching, since only node N6 is isolated but traffic stream 4 is required for nodes N2 and N5. As a reaction to the failure, node N5 activates a protection switching of traffic stream 4 from ring 2 back to ring 1. However, since node N6, which is both next and exit node for traffic stream 4, is isolated, node N5 squelches traffic stream 4 looped back to ring 1. The squelched signal is indicated by a broken line in FIG. 4.

Figure 5:
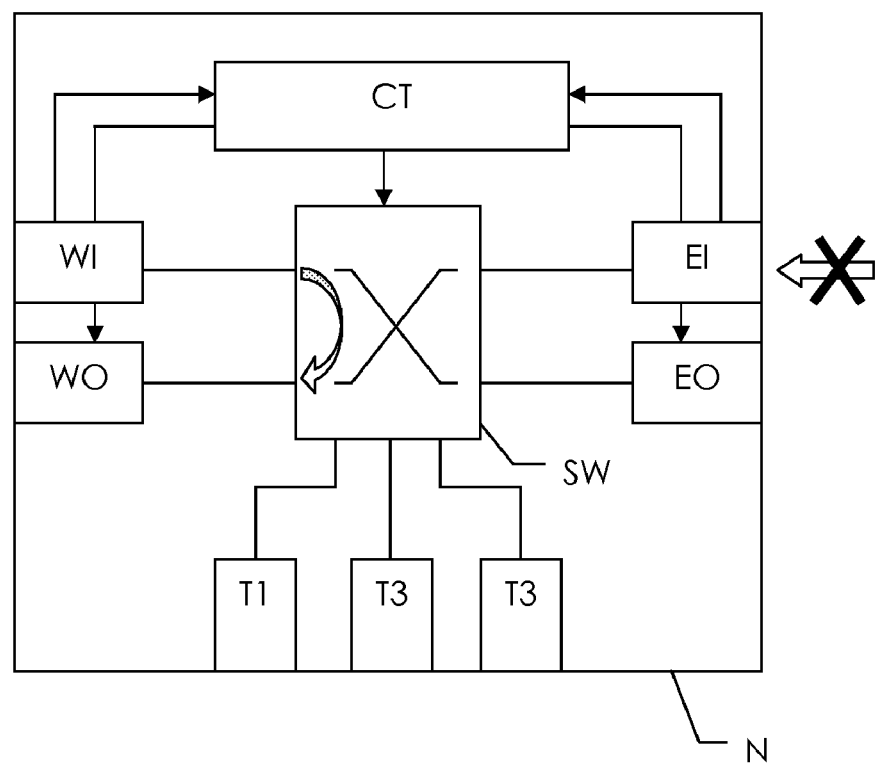

A network node N that can be used for the implementation of the invention is shown schematically in FIG. 5. Network node N has west and east interfaces for connection to the ring. In particular a west input IW, a west output OW, an east input EI and an east output EO. In addition, node N has a number of tributary interfaces T1-T3 for adding and/or dropping tributary traffic streams to or from the ring, respectively. Between the interfaces, there is a switch matrix SW, which connects east and west interfaces and tributary interfaces.

A controller CT controls the switch matrix SW. Controller CT receives error messages such as SSF from the input interfaces EI, WI and reconfigures the switch matrix SW for protection switching in the event of a failure. Moreover, APS signaling is extracted at the input ports EI, WI and forwarded to controller CT.

FIG. 5 shows a simplified failure scenario. Traffic at east input EI is lost and a loss of signal (LOS) detected. As a consequence action, protected traffic from west input WI is looped back by switch matrix SW to each output EO, so that it can reach its destination over the reverse ring direction. In addition the APS signal containing the signal failure indication is transmitted to the node adjacent to the node N over the short path (i.e. through interface EO) and over the long path (i.e. through interface WO).

According to the invention, controller CT stores a connection map and a squelching table. Based on this information, controller CT determines in accordance with predetermined squelching rules traffic signals to be squelched and instructs the output interfaces EO, WO to squelch such output signals. Thus controller CT implements the squelching rules discussed before.

It should be noted that east and west interface are distinguished only for the purpose of their function in the ring but can be of the same physical structure. The same comment applies also for the tributary interfaces.

After having read and understood the above, non-limiting embodiments of the invention, it will be appreciated that the proposed modifications to the squelching rules allow implementation of an efficient and scalable ring protection scheme in a packet ring network. Those skilled in the art will also appreciate that various modifications and changes are possible to the abode described implementations. It will be appreciated for example, that even though the invention has been explained for a 2-fiber ring, the proposed protection scheme can equally be applied to a bidirectional 4-fiber ring.

According to a further improvement, it is proposed to reconfigure certain squelching tables at the ring nodes after detection of a failure. In case of point-to-multipoint connections the solution implies that the d&c nodes are aware of the status of next and the last node participating in this connection. This means that when the connection is modified so that the drop point added/removed at certain node, the previous node participating in this connection (relative to the connection flow) should reconfigure its squelching table to indicate the changes.

What is claimed is:
1. A method, said method comprising:
  detecting a failure at a first network node in a packet transport network comprising a bidirectional ring network;
  communicating said failure along said ring network using an automatic protection switching protocol;
  at said first node or at a second node adjacent to said failure, activating a protection switch-over for at least one protected traffic stream by redirecting said traffic stream into the reverse direction of said ring network;
  if at last network node along said ring network that is not isolated by said failure from an entry node for said traffic stream performs either an add function or a drop & continue function for said traffic stream, selecting said last network node, otherwise selecting last network node along said ring network that is not isolated by said failure from said entry node and that performs either art add function or a drop & continue function for said traffic stream; and squelching said traffic stream by said selected network node, and wherein said squelching of said traffic stream is performed for point-to-point connections at the entry node for said connection and for point-to-multipoint connections at the last drop & continue node along the ring network that is not isolated from the entry node by said failure.

2. The method of claim 1, wherein squelching tables for a protected connection are provisioned to only those nodes in the ring network that perform an add function, a drop function, or a drop & continue function for said connection.

3. The method of claim 1, wherein said squelching of said traffic stream comprises replacing the protected traffic stream with an AIS signal.

4. The method of claim 1, wherein said packet transport network is an MPLS network or T-MPLS network.

5. The method of claim 1, wherein said ring network is a 2-fiber ring network or a 4-fiber ring network.

6. A network node, comprising:
first type interfaces for connection to a packet ring network;
second type interfaces for adding or dropping traffic signals to or from the ring network respectively; and
a switch matrix arranged between said first type and second type interfaces,
wherein said network node further comprises a controller controlling said switch matrix to redirect a protected traffic stream in the event of a failure,
wherein said controller is adapted to determine in accordance with a set of squelching rules and based on a pre-configured squelching table traffic streams to be squelched, wherein if said network node performs either an add or a drop & continue function for said traffic streams, said squelching table contains said traffic streams, otherwise said squelching table does not contain said traffic streams, and wherein said network node is configured to squelch said traffic stream for point-to-point connections if said network node is the entry node for said connection and for point-to-multipoint connections if said network node is the last drop & continue node along the ring network that is not isolated from the entry node by said failure.

7. The network node of claim 6, wherein said network node is configured to replace the protected traffic stream with an AIS signal if the traffic stream is squelched.

8. The network node of claim 6, wherein said packet ring network is an MPLS network or T-MPLS network.

9. The network node of claim 6, wherein said ring network is a 2-fiber ring network or a 4-fiber ring network.

* * * * *